June 8, 1965  H. KORNBICHLER ETAL  3,188,277
SUPERHEATER REACTOR

Filed Feb. 25, 1960  2 Sheets-Sheet 1

Inventors
HEINZ KORNBICHLER
HANS KLUGE
ERHARD FISCHER

By Toulmin & Toulmin
Attorneys

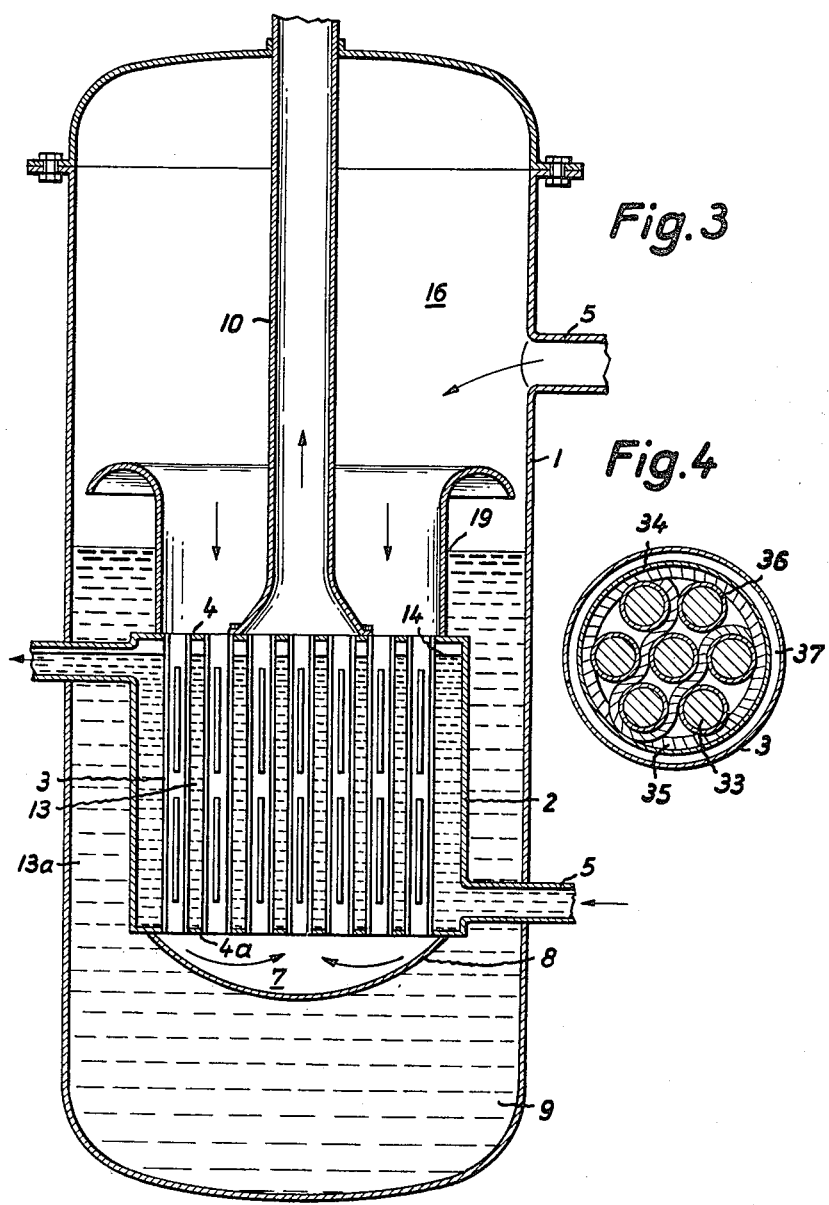

United States Patent Office 3,188,277
Patented June 8, 1965

3,188,277
SUPERHEATER REACTOR
Heinz Kornbichler, Walldorf, and Erhard Fischer and Hans Kluge, Frankfurt, Germany, assignors to Licentia Patent-Verwaltung-G.m.b.H., Frankfurt am Main, Germany
Filed Feb. 25, 1960, Ser. No. 11,096
Claims priority, application Germany, Feb. 26, 1959, L 32,559
5 Claims. (Cl. 176—59)

The present invention relates to atomic power plants. More in particular, the present invention relates to reactors and more particularly still to a superheater reactor especially used in combination with a boiling water reactor supplying saturated steam to be superheated by the superheater reactor.

In recent years, essentially two types of power-plant reactors have been developed, namely the Calder-Hall type in England and the boiling water reactor in the U.S.A. Whereas in the former, a slight superheating of the steam is possible, the latter works with saturated steam in the turbine. In both cases, the turbine has to be operated with wet steam and the thermal efficiency is only low because the steam temperatures are far below those usual in modern coal power palnts.

The efficiency of a nuclear power plant can be considerably improved by installing a superheater. For uniformity in construction and in the supply of fuel, superheating by means of nuclear energy is desirable. It has, therefore, already been proposed more than once either to connect in series a plurality of reactors for the purpose of superheating, or to obtain the superheating in a reactor by special means.

Russian sources have described a nuclear power plant with nuclear superheating for 100 mw.$_{el}$. The steam conditions at the turbine are 90 atm. absolute pressure and 500° C., that is to say perfectly comparable with modern coal power plants. The reactor is graphite-moderated, about 6 meters high and 7 meters in diameter with a thermal output of 275 mw. It contains about 1000 units of fuel elements with pressurized cooling channels. One unit consists of a graphite cylinder with seven cylindrical bores. Fitted into the center bore is a thin-walled tube of stainless steel which can withstand the pressure of the coolant. The six outer bores contain the fuel in the form of tubes. Pressure-resistant steel tubes are likewise fitted into the fuel tubes. In addition, the fuel is separated by a steel tube from the graphite. The coolant enters the element from above, flows down through the center channel and up again through the six outer channels. In the course of this it absorbs heat from the fuel layer. Some of the elements described above serve to produce saturated steam, others to superheat the steam. The fuel consists of a uranium-molybdenum alloy with an enrichment of 1.3% in $U^{235}$. The maximum fuel temperature amounts to 550° C.

A project in which the superheating takes place in a light-water reactor is known from the U.S.A. The reactor of this 62 mw.$_{el}$ project is a boiling-water reactor having the dimensions of 1.8 meters in height and 1.8 meters in diameter, in which a cylindrical superheating zone is installed. The steam produced in the boiling zone is separated from the water by separate steam separators in the reactor tank and flows down through the elements of the inner zone in which the steam is superheated to 440° C. The pressure at the turbine amounts to 39 atm. above atmospheric pressure. The superheater element consists of five coaxial tubes. The three inner ones contain the fuel in the form of a cermet consisting of $UO_2$ and stainless steel with a protective layer of steel on both sides. The enrichment amounts to 20% $U^{235}$. The outer two tubes consist of stainless steel. Between them is stagnant steam which thermally insulates the element from the water at boiling temperature serving as a moderator. With a thermal reactor output of 203 mw., the plant works with a net efficiency of 30.5%.

In this project, which must be regarded as an experiment with nuclear superheating, pressure and temperature are still far below the values which should be aimed at. According to American data, the fuel costs for the superheater component are higher than in the fossil superheaters. This is understandable because an enrichment of 20% is necessary and, in addition, the production of the various tubes constituting the fuel elements is very expensive. It is argued that these high costs are of little significance because only about 20% of the reactor power is used for superheating. However, if higher final temperatures are selected, then the proportion of the superheating power is necessarily higher. The mentioned efficiency of 30.5% is still not substantially higher than that of large boiling water plants. The efficiency can be improved by changing over to larger units. The construction of larger reactors of this type involves technological difficulties, however.

In the Russian project, steam conditions are obtained, which fully correspond to modern requirements. On the other hand, the following disadvantages have to be faced: The reactor contains a great deal of steel which strongly absorbs neutrons. Accordingly, with the selected enrichment of 1.3%, a much higher specific fuel charge is necessary. The expected burn-up is 2,300 mw. d./t.; this is lower than that obtained with natural uranium in the Calder-Hall type. In addition, the fuel tubes of uranium alloy are difficult to manufacture. The replacement of the fuel elements involves complicated and tedious work because the connections of all 1,000 fuel-element units have to be bolted in a pressure-tight manner.

It is the object of the invention to indicate ways and means leading to an economic production of energy by means of nuclear superheating. The thermal graphite reactor cannot be used for this purpose because its size is so large, that pressure vessels for about 70 atm. cannot, at present, be produced in this size. It would, therefore, be necessary to work with pressure-resistant tubes. As a result, not only would there be too much structural material in the reactor, but it would also be difficult to seal off the connections on changing the elements.

It is a further object of the invention to provide a fuel element for serving the said purpose, which element has low enrichment and permits a high burn-up and so reduces the fuel costs in comparison with the previous projects. In addition, as a result of the invention, steam conditions of about 70 atmospheres and 500° C. can be achieved which ensure a satisfactory degree of efficiency in large plants.

Furthermore, those difficulties which arise in the installation of the superheater zone in a boiling water reactor are avoided as a result of the fact that the superheating is carried out in a separate reactor. In the present state of the art, two reactors are necessary in any case for plants having a correspondingly high capacity. Thus the apparent advantage of constructing a single unit as a superheater reactor is lost in this respect.

These objects as well as other objects and advantages, which will become apparent from the following description, are achieved by the superheater reactor of the present invention of a nuclear power plant having two or more reactors and wherein saturated steam is tapped from one or several of the reactors, for example a boiling water reactor, whereupon the saturated steam is superheated in the superheater reactor according to the present invention. The superheater reactor has a pressure vessel and a reactor core therein, formed of a plurality of tubular elements containing the fuel elements, each fuel element preferably consisting of a bundle of fuel rods, and simultaneously serving as cooling channels. The assembly of tubular elements forms an inner zone, and peripherally arranged thereabout, an outer zone. Moderating water fills the space between the tubular elements, and the fuel elements are thermally insulated from the moderating water. The tubular elements can be fixed at their respective upper and lower ends to an upper and a lower end plate, respectively.

The saturated steam first passes through the outer zone of the cooling channels and is pre-superheated, and then passes in opposite direction through the inner zone so as to attain its maximum temperature.

The upper end plate can be connected with the lower end plate by a cylindrical mantle, thus obtaining a tank-like structure housing the tubular elements, which preferably has a plurality of perforations, the latter enabling a utilization of the heat energy produced in the moderator, as will be more fully described further below.

It has also been found to be of advantage, for reasons explained further below, to fill the pressure vessel partly with water.

The invention will be more fully appreciated upon the following description of the accompanying drawings, wherein FIGURE 1 is a longitudinally sectional view of the superheater reactor of the present invention;

FIGURE 3 is a longitudinally sectional view of still another embodiment of the superheater reactor of the present invention;

FIGURE 4 is a cross sectional view of a fuel element preferably used in connection with the superheater reactor of the present invention.

Figure 1:
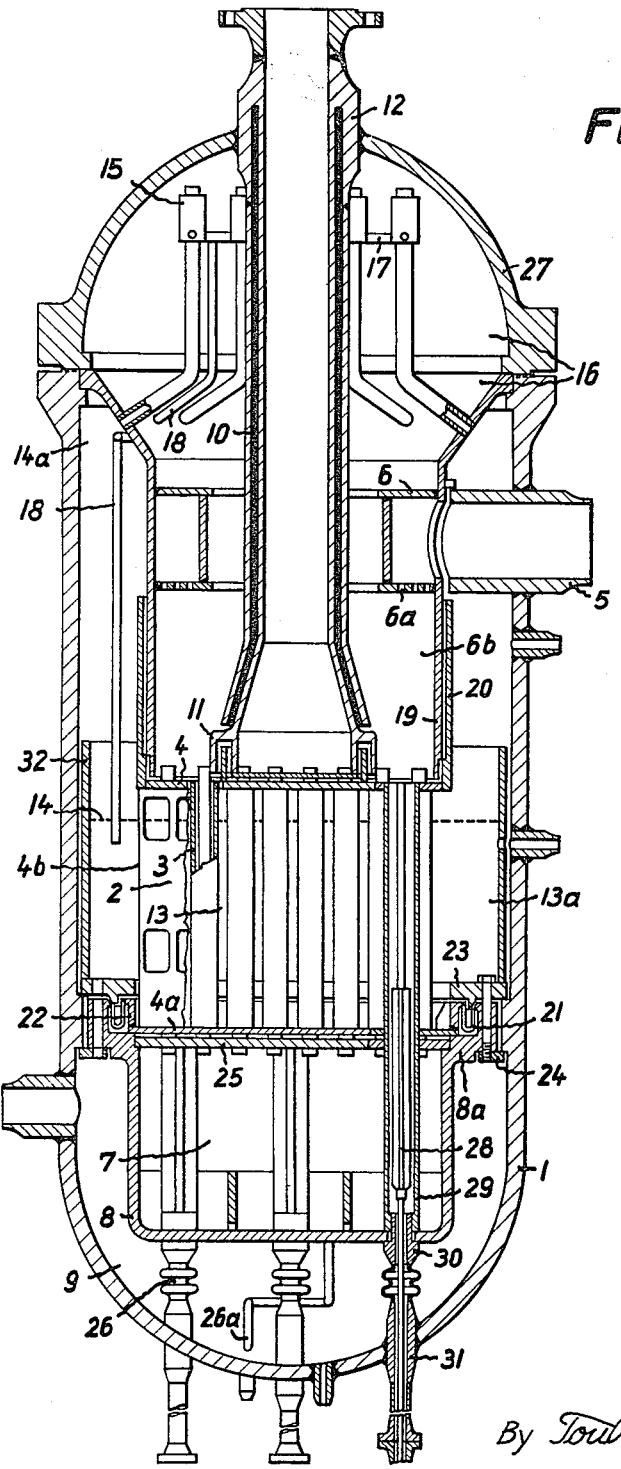

Describing now the drawings more in detail and turning first to FIGURE 1, the superheater reactor comprises a reactor pressure vessel 1, housing a reactor core 2. The reactor core consists of a bundle of tubular elements 3, constituting cooling channels. The tubes may consist, for example, of a material such as high-grade steel or zirconium alloy. At their respective upper and lower ends the tubes 3 are connected with end plates 4 and 4a by any suitable connection such as, for example, welding. The end plates 4 and 4a are interconnected by a cylindrical mantle 4b, having a plurality of perforations, so as to obtain a perforated tank-like structure comprising the end plates 4 and 4a and the perforated cylindrical mantle 4b. The reactor pressure vessel 1 is provided with an inlet 5 for receiving saturated steam. In substantially the same area there is provided, inside of the reactor pressure vessel, a distributing member, such as the distributing ring 6, having at its lower sides, a plurality of openings 6a, below which provision is made for the steam space 6b.

In the lower portion of the reactor pressure vessel 1 a reversing space 7 is formed by steel container 8. The function of this steel container is to keep away the hot steam from the wall of the reactor pressure vessel. The intermediate space 9 between steel container 8 and the lower portion of pressure vessel 1 is filled with water in boiling state. A steam removal conduit 10 extends above the tubes 3 and is led out of the upper portion of the reactor pressure vessel through a suitable sealing. At its lower end the conduit 10 is connected with the upper end plate 4, the upper part of conduit 10 is joined to cover 27, and thus conduit 10 can be easily removed therewith. The upper portion of conduit 10, led to the outside through cover 27, is constructed as a thermal sleeve 12.

In the upper portion of reactor pressure vessel 1 there are provided steam chamber or separating tubes 15 in a steam space 16. The steam separators 15 are connected with an annular conduit 17 and an outlet conduit 18. An annular gap 14a is formed in the central and upper portions of the pressure vessel 1 between the wall of the latter and a steel wall 19 provided in the interior of the pressure vessel. The thickness of the steel wall 19 is so chosen, that in case of a pressure drop in the steam space it is capable of receiving the differential pressure which, in an extreme situation, can be equal to the full operational pressure, that is up to about 100 atmospheres. The steel wall 19 engages a container 20, having a comparatively thin wall, substantially thinner than steel wall 19, with the upper end plate 4 in such a manner, that a labyrinth-type sealing is obtained. In case of a pressure drop within steam space 16 the thin wall of container 20 is pressed against the steel wall so that the sealing is reinforced.

In order to enable an optimal heat expansion the bundle of tubes is preferably arranged in the following manner: The lower end plate 4a is loosely positioned on a ledge 8a of steel container 8. This makes it possible for the bundle of tubes to expand in all directions. The necessary sealing between the moderator space 13a, disposed peripherally between the bundle of tubes 3 at the reversing space 7, is effected by means of a radial-compensator 21. The radial compensator 21 is connected with a ring 22, welded against the lower end plate 4a and it is also pressure-tightly connected with the supporting ledge 8a by means of a clamp 23 and a counter ring 24.

If the lower end plate 4a is composed of zirconium alloy preferably special means are provided for checking the corrosion due to the influence of the hot steam within the reversing space 7. These means may consist of a steel plate 25 disposed at a certain distance below the lower end plate 4a so as to form a gap therebetween. This gap is filled with saturated vapor. An identical arrangement can be provided at the upper end plate 4. For the purpose of insulation saturated vapor also fills the insulating gap of the fuel elements and the sheaths of the reactor control bars, as will be described further below.

The reactor control bars 28 are disposed in sheaths 29 extending through the reactor core 2 as well as the reversing space 7. The sheaths 29 are guided through steel container 8 as well as pressure vessel 1 via pressure-tight passages 30 and 31, respectively. A wave-shaped thermal compensator 26 is disposed between passages 30 and 31, allowing for the relative movement of reactor pressure vessel 1 and steel container 8.

Turning next to the fuel element preferably used with the superheater reactor of the present invention, such a fuel element consists of a bundle of $UO_2$ bars 33. Preferably, seven $UO_2$ bars are used for forming one bundle. This particular number of seven bars has proved to be particularly advantageous for reasons of optimal distribution of the flux of neutrons. Each individual bar is wrapped in a sleeve 36, consisting of high-grade steel or another corrosion-binding material. The bundle of tubes is enclosed in a steel tube 34 having a comparatively thin wall. The individual bars 33 are maintained in space relationship to one another, as well as with respect to steel tube 34, by interposed wave-shaped steel wires 35. This arrangement of the steel wires 35 results in an excellent turbulent mixing of the cooling agent, thereby resulting in an excellent heat exchange. Each bundle of tubes is housed in an outer tube 3, arranged concentrically with respect to tube 34, a narrow gap 37 being formed between outer tube 3 and tube 34. This narrow gap is filled with stagnant steam, thermally insulating the outer tube 3 from the bundle of fuel elements 33. It is, of course, possible to use an insulating layer of ceramic material instead of the stagnant steam insulation.

The various fuel elements should be spaced apart from each other by a small distance, for example in the range of from 1 to 2 millimeters. Thereby, the cross sectional area of the current flow of the cooling medium is made small, which results in a better heat exchange. For further improvement of the heat exchange the velocity of flow of the cooling medium can be chosen to be comparatively high, for example in the range of about 50 meters per second.

The arrangement of the fuel elements in the form of a plurality of bundles is particularly advantageous in as much as the neutrons resonance capture is kept low. As a consequence, the superheater reactor can be operated with a comparatively low enrichment, that is with an enrichment approximately in the order of 2.5%, and a higher burnup can be obtained. In order to manage with little structural material, the fuel rods may be made as thick as possible. If fuel bars are chosen having a diameter of 1 centimeter, the thermal load applied to the heating surfaces may attain as much as $10^6$ cal./m.$^2$ per hour, without melting the fuel material. The thermal load of the fuel is thus just as high as in the known boiling water reactors and the pressure water reactors. If saturated vapor, having a temperature of 285° C., is fed into the reactor, then the temperature of the steam in the reversing space 7 is approximately 420° and the temperature of the superheated steam leaving the reactor is about 500° C.

The temperature of the superheated steam leaving the reactor depends on the lengths of the cooling channels. It has been found that the desired final temperature of 500° C. with an initial temperature of 285° C. of the saturated steam filled into the reactor is obtained if both the height and the diameter of the reactor core are in the order of about 2 meters. For known reasons of neutron physics it is particularly advantageous to provide a reactor core, the height of which is substantially identical with its diameter. It will be apparent that this reactor device according to the present invention is highly superior to the afore-described Russian reactor having a height of 6 meters and using graphite as a moderator.

Figure 2:
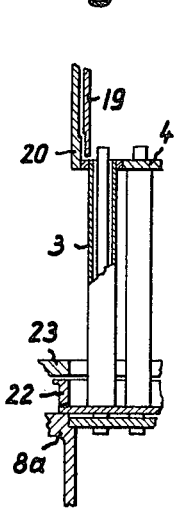
FIGURE 2 is a fragmentary view, in longitudinal section, showing a modified form of the superheater reactor of FIGURE 1.

According to another preferred embodiment of the invention, shown in FIGURE 2, the perforated cylindrical mantle 4b of the embodiment of FIGURE 1 is dispensed with and there are only provided the upper and lower end plates 4 and 4a. All other elements in the structural arrangement are identical with the embodiment shown in FIGURE 1 and are, therefore, not shown in FIGURE 2.

According to still another embodiment of the invention, shown in a somewhat simplified view in FIGURE 3, there is provided a reactor core 2, consisting of upper and lower end plates 4 and 4a and a cylindrical mantle not having the perforations as in the embodiment of FIGURE 1. In this embodiment, the steam separating tubes 15 can be dispensed with. The decisive difference of this embodiment resides in the fact that the reactor core 2 comprises a tank-like structure housing a tubular element 3, which tank-like structure is formed by the end plates 4 and 4a with a full, non-perforated cylindrical mantle connecting the end plates with each other.

The superheater reactor of the invention operates in the following manner: Staurated steam is tapped from a conventional boiling water reactor and is fed into the superheater reactor of the present invention via inlet 5. The steam then passes through openings 6a of the distributing ring 6 into steam space 6b. From the steam space 6b it passes into the reactor core, flowing through those cooling channels 3 forming an outer cooling zone, as indicated by the two downwardly pointed arrows in FIGURE 3. While passing through these channels, the saturated steam is superheated and while it had a temperature of about 285° C. is fed into the superheater reactor, which has a temperature of about 420° C., when leaving the outer cooling channels and entering reversing space 7. The direction of flow of the steam is reversed in chamber 7 and the pre-superheated steam enters the inner superheating zone formed by a plurality of interiorly disposed cooling channels 3. When travelling through these inner chanels, the pre-superheated steam is further superheated up to its maximum temperature which is, for example, 500° C. The superheated steam then leaves the superheater reactor through outlet pipe conduit 10. The control of the reactor capacity is effected in a known manner as used, for example, with gas-cooled reactors, conditioned upon the outlet temperature of the cooling medium.

As a moderator water is used, filling the space 13 between the tubes 3 and the space 13a between the reactor core and the reactor pressure vessel and, during its passage through the reactor, the moderator is heated by the γ radiation absorbed by the moderator and by the heat of the steam which leaks through the heat insulation. This heat must be removed and in the embodiment shown in FIGURE 3 this is done by passing the moderator out of the reactor vessel. However, preferably the heat energy which otherwise would be lost is utilized. This can be done by so choosing the moderator throughput that the moderator partly evaporates in the reactor core and that the vapor thus produced is admixed to the saturated vapor fed into the superheater reactor. It has been found that this evaporation takes place as long as the natural rate of flow of the moderator through the reactor is not changed, for example, by pumps and the like. Speeding up the throughput rate of the moderator.

The admixture of the evaporated portion of the moderator can be effected by the structural arrangement of the embodiment of FIGURES 1 and 2; in the embodiment of FIGURE 1 the moderator tank, that is the cylindrical mantle 4b connecting the end plates 4 and 4a, has a plurality of perforations as described above, preferably arranged in the upper portion of the cylindrical mantle. The steam coming from the outlets of the evaporizing moderator can thus pass through the openings in cylindrical mantle 4b and enter the water in space 14. The water level in this space is about 20 centimeters above the upper end of the active zone of reactor core 2. The evaporated moderator then rises through annular gap 14a, reaches the steam separator tubes 14, enters steam space 16 and is admixed to the incoming steam. The water flows down through the gap 14 and reenters the reactor core by the lower perforations.

The entire steam in space 16 then passes through distributing ring 6 and travels further as described above.

Instead of providing an even more thorough admixture, the same effect is achieved by entirely dispensing with the cylindrical mantle 4b and providing only an upper and a lower end 4 and 4a, connected with tubular elements 3, as shown by the fragmentary view of FIGURE 2.

The shut-down procedure of the power plant comprising a superheater reactor of the present invention can be carried out in the following manner:

The control bars 28 are introduced in their sheaths 29 into the reactor, thereby lowering, in a known manner, the power output of the superheater reactor at full steam throughput; at the same time the turbine operated by the superheated stream is cut off and the steam is conveyed directly into the condenser. The fuel elements are thus cooled down to a temperature of about 320° C. By fully introducing the control bars, the output of the superheater reactor is further reduced, while the boiling water reactor connected up-stream continues to produce so much steam that the superheater elements are slowly cooled down to substantially the saturation temperature of the steam. Then the superheater reactor can be flooded without risk of a thermal shock by a supply of water having boiling temperatures. The flooding removes the heat produced after the shut-down by γ radiation. The slow cooling, lasting for about 10 to 15 minutes, prevents damage which would otherwise be done to the fuel elements. If the reactor would be flooded during its normal operation, its reactivity would rise by about 1% and thus reach a critical value. It is, therefore, of the utmost importance to first effect the afore-described shut-down procedure and then flood the reactor.

In the case of an emergency shut-down of the preceding boiling water reactor, a separate emergency cooling must be provided. For this purpose the pressure vessel of the superheater reactor is also partially filled with water which, in normal operation, when no special cooling of the moderator takes place, is at boiling temperature. In an emergency shut-down, steam for the emergency cooling is produced by lowering the operating pressure until the elements have cooled down to such an extent that the reactor can be flooded.

If the flooded reactor is to be put back into operation, it will first become necessary to pre-heat the same in a known manner by an extraneous heat source. As soon as the operational temperature has been reached, saturated steam is fed into the superheater reactor, which reaches the cooling channel as described further above, where it displaces the water resting therein. The water in reversing space 7 is removed through outlet 26a. The reactor is then brought to the requisite critical state and to the desired self-continuing power output by pulling out the control bars in a generally known manner.

It will be understood that this invention is susceptible to modification in order to adapt it to different usages and conditions and, accordingly, it is desired to comprehend such modifications within this invention as may fall within the scope of the appended claims.

What we claim is:

1. A superheater reactor comprising a pressure vessel, a reactor core including a tank-like structure being filled with moderator water and being disposed in said pressure vessel, a plurality of tubular elements disposed in said tank constituting cooling channels and being divided so as to form an outer cooling zone and an inner cooling zone, all tubular elements being inserted in said moderator water, a plurality of fuel elements in said tubular elements each consisting of a bundle of fuel rods, means defining a narrow gap between each tubular element and the fuel elements therein, which gap is filled with stagnating steam for thermally insulating said fuel elements from the moderator water, a steam chamber disposed at one end of said tank-like structure and communicating with the cooling channels of only said outer cooling zone, means for removing superheated steam at said one end, and communicating with the cooling channels of only said inner cooling zone, means for feeding saturated steam into said steam chamber, said steam passing in one direction through said tubular elements forming said outer zone, so as to become pre-superheated, and a mixing chamber disposed at the opposite end of said tank-like structure, communicating with all tubular elements and constituting steam guiding means for passing the pre-superheated steam from the outer zone channels in opposite direction through said channels forming said inner zone, so as to become finally superheated to the desired maximum temperature.

2. The superheater reactor according to claim 1, wherein vertical walls of said moderator water tank are provided with a plurality of perforations, thereby permitting vaporized moderator to exit from said moderator water tank.

3. A superheater reactor of a nuclear power plant according to claim 1, comprising a first end plate fixed to the upper end of said tubular elements below said steam chamber, and a second end plate fixed to the lower end of said tubular elements.

4. A superheater reactor of a nuclear power plant according to claim 1, wherein said pressure vessel is partially filled with water, with the water in said pressure vessel evaporating whenever the pressure therein is lowered, so as to effect an emergency cooling.

5. A superheater reactor of a nuclear power plant according to claim 1, said moderator tank comprising an upper end plate fixed to the upper end of said tubular elements, and a lower end plate fixed to the lower end of said tubular elements, and a cylindrical mantle connecting said upper end plate with said lower end plate.

References Cited by the Examiner

UNITED STATES PATENTS

| 1,993,747 | 3/35 | Novac | 122—31 |
| 2,806,820 | 9/57 | Wigner | 176—54 |
| 2,832,733 | 4/58 | Sziland | 176—52 |
| 2,873,242 | 2/59 | Treshow | 176—56 |
| 2,917,444 | 12/59 | Dreffin | 176—51 |
| 2,938,845 | 5/60 | Treshow | 176—54 |
| 2,998,367 | 8/61 | Untermyer | 176—56 |
| 3,034,977 | 5/62 | Hall et al. | 176—54 |
| 3,085,959 | 4/63 | Germer | 176—60 |

FOREIGN PATENTS

| 1,141,064 | 3/57 | France. |
| 1,039,659 | 9/58 | Germany. |
| 754,183 | 8/56 | Great Britain. |
| 798,282 | 7/58 | Great Britain. |
| 799,725 | 8/58 | Great Britain. |

OTHER REFERENCES

Proceedings of the International Conference on the Peaceful Uses of Atomic Energy, 1955, United Nations, N.Y., vol. 2, p. 345.

ANL–5053, p. 13, AEC publication, Dec. 19, 1956.

WAPD–PWR–PMM–904, p. 80, Dec. 3, 1956, AEC publication.

Kramer: Boiling Water Reactors, Addison-Wesley, 1958.

CARL D. QUARFORTH, *Primary Examiner.*

WILLIAM G. WILES, ROGER L. CAMPBELL, LEON D. ROSDOL, *Examiners.*